June 7, 1938.  W. THALER  2,120,010
CONTROL AND REGULATOR MEANS FOR ACTUATING MECHANISMS
Filed Sept. 29, 1934  3 Sheets—Sheet 1
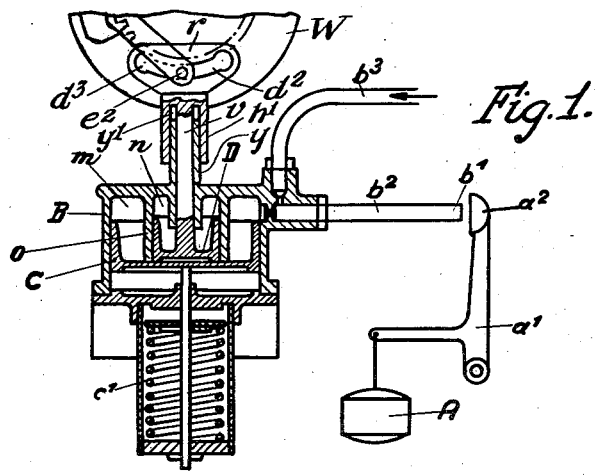
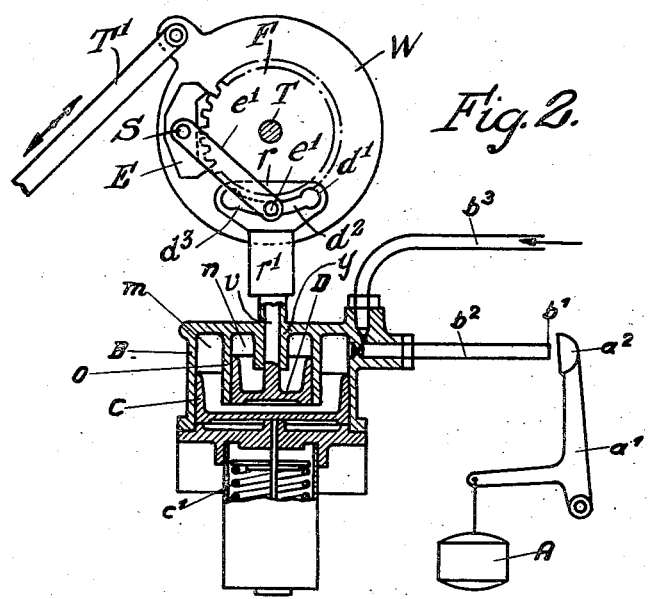
INVENTOR
WILHELM THALER
ATTORNEY INVENTOR
WILHELM THALER
C. P. Goepel
ATTORNEY June 7, 1938.   W. THALER   2,120,010
CONTROL AND REGULATOR MEANS FOR ACTUATING MECHANISMS
Filed Sept. 29, 1934   3 Sheets-Sheet 3
Fig. 5
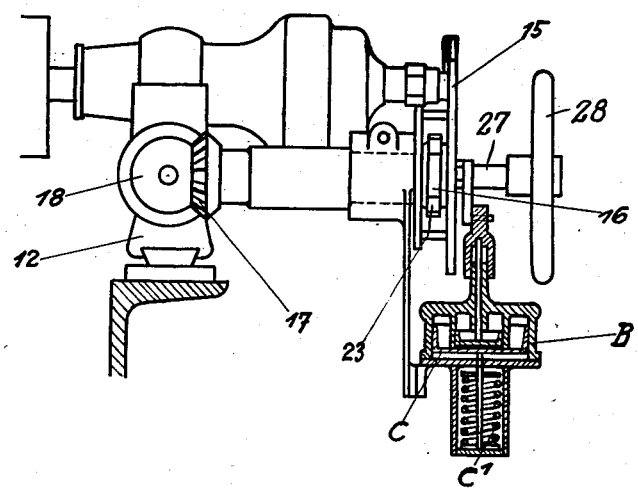
Fig. 6
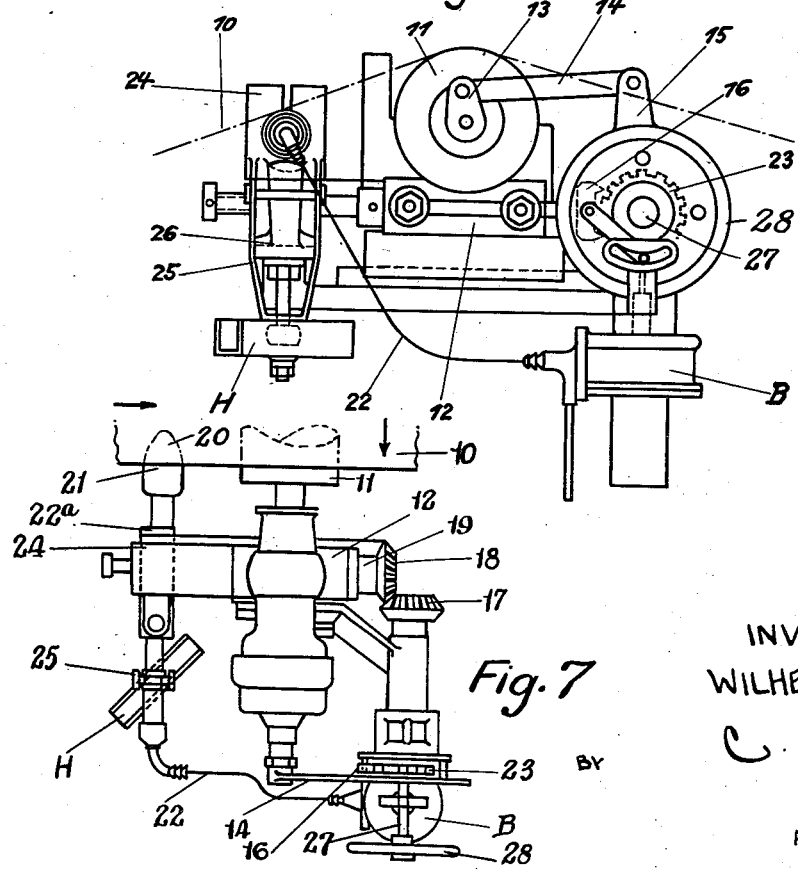
Fig. 7
INVENTOR
WILHELM THALER
C. P. Goepel
ATTORNEY.

Patented June 7, 1938

2,120,010

UNITED STATES PATENT OFFICE 2,120,010

CONTROL AND REGULATOR MEANS FOR ACTUATING MECHANISMS

Wilhelm Thaler, Heidenheim-on-the-Brenz, Germany, assignor to American Voith Contact Co., Inc., New York, N. Y., a corporation of New York Application September 29, 1934, Serial No. 746,202 In Germany October 6, 1933

3 Claims. (Cl. 121—38)

This invention relates to control and regulator means for actuating mechanisms such, for example, as mechanisms on governors, or, for example, to obtain proper straight running of revolving wires, bands or felts of the kind employed in paper-making or similar machines.

In many of the governor systems in use, the impulses are frequently transmitted pneumatically to ratchet mechanisms which enlarge the impulses and cause the desired actuation of gates, valves and the like. Such a pneumatic transmission of regulating impulses can, for instance, be accomplished through the instrumentality of a feeler device which is associated with the part to be governed and cooperates with a control nozzle or the like under the influence of either compressed air or a vacuum. Pressure changes in the nozzle are caused to actuate and control pistons which in turn actuates a ratchet and pawl mechanism. A second piston may be interposed for operation in the air supply line to cause disengagement of the ratchet mechanism in case of any failure in the air supply. One object and purpose of the present invention is to combine in one housing the two pistons by means of which the ratchet wheel with its double acting pawl is controlled.

Many constructions of wire and felt guides for paper, board and similar machines are known. In general, their regulating principle consists in the provision of a feeler device, nozzle or the like, which touches the revolving band when the latter has, through some influence, deviated from a straight running position. Mechanical, pneumatic, hydraulic or electrical means are commonly used in order to move a guide roll from its proper or normal position at right angles to the direction of movement of the band. The correcting of such regulators is slow and sluggish inasmuch as it requires quite some movement of the guide roll itself in order to obtain a correctional change of the band running over the roll. In other words, in order to make the correctional change, a substantial over-regulatory movement of the roll is necessary. By means of the present invention, these disadvantages have been eliminated by providing the regulator with a counteracting device. This is accomplished by connecting the feeler device or its support with the movable bearing of the guide roll in such a manner that it will cause the latter to execute a movement opposite to the sidewise movement of the band.

If, for instance, in a wire regulator the regulating impulse is caused by a jet of water directed against the edge of the wire, the counter-action is so carried out that the movable slide bearing of the wire guide roll will be connected with the jet nozzle in such a manner that the latter makes a movement opposite to that of the wire to be regulated. Analogously, in a felt regulator in which the regulating impulse is caused by an air current, the free exit of which from a feeler is more or less obstructed by the felt edge, the movable slide bearing of the felt guide roll can, by suitable means, be connected in such a manner that the feeler will execute a movement opposite to the movement of the felt.

The nature of the invention, its general principles and objects above referred to, as well as other objects and advantages, and the manner in which the new and novel features of construction and operation may be embodied in practical form, and means for the functions and accomplishment of the results and method herein contemplated will be hereinafter more fully described, with reference to the examples illustrated in the accompanying drawings, in which Fig. 1 is a part sectional elevation, showing two pistons combined in one housing, together with a float actuated ratchet mechanism in its neutral position;

Figs. 2 to 4 are similar views, showing the working parts including the ratchet mechanism in various operating positions;

Fig. 5 is an end elevation partly in section, showing an arrangement in which the invention may be employed for the regulation of a paper machine felt.

Fig. 6 is a side elevation of the same arrangement in connection with a regular roll for the paper or felt-sheet; and Fig. 7 is a top plan view of the parts shown in Fig. 6.

Figure 3:
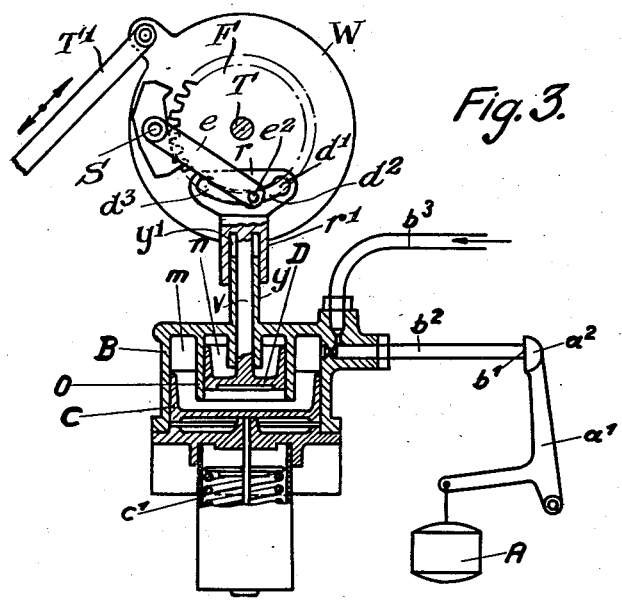

With more particular reference to the accompanying drawings, and first to Figs. 1 to 4, the invention, for purposes of illustration is shown in connection with a float A, the movement of which moves a pivoted lever $a^1$ provided with a feeler $a^2$, the last named by its movement opening or closing an air nozzle $b^1$ of air piping $b^2$ connected with piston housing B. Through pipe $b^3$ air is introduced under pressure into piston housing B, causing thereby an air arresting piston C to be forced downward, which action results in compressing repositioning spring $c^1$. In the upper portion of the chamber $m$ formed in the piston housing B is a downwardly open space or chamber $n$ which is formed by the annular flange $o$, and operatively disposed within the chamber $n$ so as to close the lower open end thereof is a piston D. Through loop $d^1$ and lever $e^1$, piston D can cause the actuation of a double pawl E and bring the same in mesh with a ratchet wheel F, swinging the pawl so as to engage either its lower tooth or its upper tooth with the ratchet wheel accordingly as the piston D is moved upwardly or downwardly from its neutral position.

In the present instance, pawl E is centrally fixed to a stub pin S rockably journaled in a disk wheel W mounted for free rocking movement on shaft T on which the ratchet wheel is fixed. The disk wheel W is rocked to and fro by a reciprocating lever $T^1$ which may be reciprocated by any suitable mechanism. It will be observed that in this arrangement, the stub pin S and hence the double-acting pawl carried thereby moves with the disk wheel W about the teeth of the ratchet wheel on an arc concentric with the central shaft T.

The loop $d^1$ comprises two similarly downwardly converging slot portions $d^2$ and $d^3$, their point of convergence comprising the low central portion of the loop in which the roller $e^2$ on the lower end of the lever $e^1$ is situated, or substantially situated, when the double-acting pawl is in neutral position, as shown in Figs. 1 and 2. The roller $e^2$ is adapted to move from the central portion upwardly into either of the slot portions $d^2$ or $d^3$. The loop $d^1$ is provided in the horizontally elongated top end $r$ of the cylindrical head $r^1$. The stem $v$ of piston D, which is slidably fitted in bushing $y$ of casing B, is secured at its upper end to the axial center of the head $r^1$, there being an annular recess $y^1$ in the lower portion of said cylindrical head to accommodate the bushing $y$ and permit vertical movement of said cylindrical head in accompaniment with the vertical movement of the piston D. By means of the central shaft T which is moved with the movement of the ratchet wheel F, a gate, valve, or similar device can be opened or closed in a manner well known in the art.

In Fig. 1, the neutral position of the double acting pawl is shown, there being no air supply available. Here the arresting piston C is shown in its highest position, having been moved up by the spring $c^1$, with the control piston D sustained in its middle or neutral position. Piston D is shown resting on piston C, an arrangement which prevents the entry of air between the two pistons, and this arrangement thereby keeps the pawl E in its neutral position as shown. With the air pressure supply through pipe $b^3$ shut off and the feeler device $a^2$ spaced from the nozzle $b^1$, the air pressure within chamber $m$ of the piston housing is that of atmospheric pressure and this is insufficient to overcome the spring force which urges the larger piston C upwardly against the lower end of annular flange $o$. In atmospheric pressure, the spring resistance to the larger piston C is sufficient to support the smaller piston D and when piston C abuts the lower end of flange $o$, piston D within said flange is sustained in such position that it holds the pawl E in neutral position.

Figure 4:
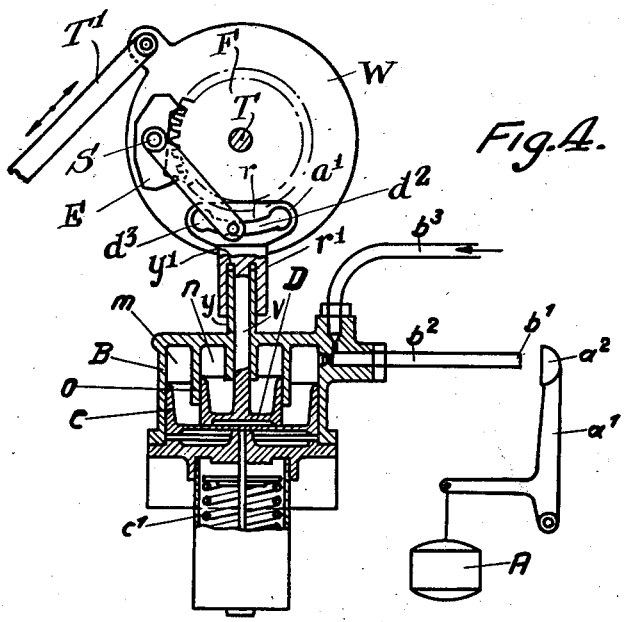

Figs. 2 to 4 show various relative positions of the pistons with respect to each other during operation. If pipe line $b^3$ is under air pressure, then due to the air pressure that is built up in chamber $m$, the arresting piston C will be forced downward against the upward urge of spring $c^1$, thereby freeing control piston D for action. If float A is in its middle or neutral position (Fig. 2) and a certain quantity of air flows through nozzle $b^1$, arresting piston C will, even under small air pressure, be forced downward against the pressure effect of spring $c^1$. Control piston D, by reason of the position of roller $e^2$ in the central loop portion and by reason of the frictional contact between the stem $v$ and bushing $y$, will not rise immediately but for the time being maintains its middle or neutral position. Fig. 2 illustrates an intermediate or changing condition in which the air building up in chamber $m$ has attained sufficient pressure to cause movement of piston C to its lowermost position but has not yet attained the force necessary to move piston D upwardly from its neutral position. In this connection the feeler device $a^2$ permits some air to escape from nozzle $b^1$, not being closed thereagainst, but the amount of air permitted to escape is of course less than that being introduced under pressure through the pipe $b^3$ so that air will build up in chamber $m$. If, however, nozzle $b^1$ is closed up, as shown in Fig. 3, the air pressure in piston housing B builds up to such an extent that control piston D is forced upward from its middle position and the lower tooth of pawl E is thereby brought into mesh with ratchet wheel F (Fig. 3). If, on the other hand, float A rises and moves the feeler device $a^2$ away from the nozzle $b^1$ so as to permit free escape of air therefrom, and thereby permitting the pressure in piston housing B to decrease, control piston D will descend and as a result the upper tooth of pawl E will be brought into engagement with ratchet wheel F, turning the same in the opposite direction (Fig. 4). The condition illustrated in Fig. 4 is also an intermediate or changing one and in this case the air pressure within the piston housing is decreasing since the escape of air through the nozzle is more rapid than the supply introduced through pipe $b^3$. Now, it requires more air pressure to sustain the smaller piston D within the annular flange $o$ than to push the larger piston C to its lowermost position against the resistance of its spring. This is due not only to the relative arrangement and the relation of the parts but to the fact that the piston C, as compared with piston D, has a much larger area that is subject to air pressure within the chamber $m$. Therefore, as air pressure decreases within the housing, the smaller piston D will descend to rest upon piston C before piston C is moved upwardly by its spring to abut the lower end of the annular flange $o$. It will be obvious, that when the pawl is engaged with the ratchet wheel, any movement of the disk wheel W which carries the pawl, will be transmitted to the ratchet wheel for operating the shaft T.

It is obvious that the piston D, from its position shown in Figure 2, after its release by the locking piston C, may move downward under its own gravity if no resisting pressure is present. In Figure 3 the control piston D is unable to move toward the locking piston C when in its lowermost position as shown, because in that case the full pressure of the pressure agent acts upon the piston D and presses the latter upward. If the pressure of the pressure agent becomes less in consequence of the opening of the outflow or exhaust pipe $b^2$, the piston D is able to move downward under the influence of its own weight. It is seen that at atmospheric pressure both pistons are in contact, and the piston D is locked or held in position by the piston C. At the highest pressure in the chamber $m$ the piston C is moved against the spring action to its lowermost position, and the piston D to its uppermost position against the action of gravity and against the necessary forces to do the work intended. Intermediate pressures cause the piston D to take an intermediate position between the highest and lowest positions.

By this invention, a compact arrangement of the ratchet and control mechanism is accomplished as to the two pistons which are combined in one housing. This arrangement greatly simplifies the air supply lines, as will be evident, in contrast to previously known arrangements in which separate pistons, remote from each other and uncombined, participated in the oscillation of the ratchet wheel, the new combined piston can now function in a single stationary housing. The air hose formerly employed was subjected to great wear inasmuch as the same moved with the pistons, while under the new combined arrangement, fixed air pipes can be provided. Inasmuch as the device must often operate in dusty and wet localities, the new control enclosed in a housing and with only one actuating lever, functions much better and with greater reliability.

Referring to Figs. 5, 6, and 7, the paper sheet or felt 10 runs in the direction of the arrow X over regulator roll 11 which in a known manner is adjustably supported by resting at one end in a slide bearing 12, by means of which it can be moved sidewise in either direction out of its normal position, which is at right angles to the run of the sheet.

The effect of this movement in the regulation of wires or felts in paper-making or similar machines is generally known. The impulses for the movement of the roll are derived from its own rotary movement by means of crank 13 which, through rod 14, acts upon swing lever 15, to which is attached pawl 16 designed for action in both directions of rotation. In a manner to be explained hereinafter, this pawl is according to conditions caused to act either one way or the other, causing a corresponding left hand or right hand rotation of conical gear 17 in mesh with conical gear 18, and, therefore, causes a corresponding rotation of spindle 19 so that slide bearing 12 of the guide roll can be moved either in the direction in which the sheet is running or in a counter-direction.

The actuation of the double pawl 16 is effected by means of air nozzle feeler 20 positioned underneath the edge of the sheet. This air nozzle feeler 20 is provided with an air hole 21 forming the orifice of air piping 22, which leads to the piston housing B containing the combined pistons C and D. If the sheet covers opening 21, the air pressure will cause the control piston D to rise and thereby cause pawl 16 to engage and move the ratchet 23 and hence the slide bearing and guide roll in one direction. If, on the other hand, the sheet recedes entirely from opening 21, the air can escape from the opening which causes piston D to fall and the other end of double acting pawl 16 is in consequence brought into engagement with the ratchet wheel to cause movement of the roll in the opposite direction.

It is to be understood that the feeler piece 20 is not connected to the machine frame work but is disposed so as to be adjustable transversely to the run of the sheet. For this purpose, the pipe shaped holder 22a is adjustably arranged in a guide 24 which is fixedly connected to slide bearing 12 of the guide roll. At its outer end, there is a downwardly extending lever 25 which swings about a fixed bearing 26 connected to slide bearing 12 and at its lower end said lever 25 is guided in guide rail H which is firmly connected to the machine frame.

The manner of operation of the device may be described for example, as follows:—

In normal operating position, the air opening 21 is covered about half way by the sheet. The double acting pawl 16 is in neutral position and slide bearing 12 of the regulating roll is at rest. Now, if the sheet leaves its straight run, running for instance sidewise in the direction of the arrow Y, air opening 21 will be closed up, the pressure in the piston housing B in consequence thereof building up and forcing control piston D to rise with the result that the slide bearing is moved in the direction of the run of the sheet (arrow X). The slanting position of the guide roll which is brought about by this operation will in a known manner cause the sheet to return to its normal run. At the same time, however, the joint action of slant guide H and nozzle body 20 will move the latter outwardly so that in the conjunction of nozzle and sheet, an effort is caused to re-establish the half covered position of opening 21, and after this is accomplished, and due to the change in pressure, the double acting pawl is moved into its neutral position again, to give rise to an excess impulse for entirely freeing nozzle opening 21 which through the full descent of piston D will cause the other end of the double acting pawl to come into engagement with the ratchet, thereby bringing the slide bearing 12 back into its normal position.

Should the air supply fail for any reason, arresting piston C, due to the expansion of spring $c^1$ will rise to its highest position with control piston D sustained in its neutral position. By preventing the entry of air through the supply pipe, the double acting pawl will be retained in its neutral position as will be evident. Failure of the air supply will, therefore, automatically disengage the double acting pawl and free the adjusting device of the guide roll for hand operation. When the pawl is in neutral position the conical gear 17 may be operated by hand, the shaft of this conical gear having for this purpose an extension 27 to which is fixed a hand wheel 28.

It will be evident that it is immaterial in which way the regulating impulse is created and in which manner the impulse is transmitted to the guide roll. The present invention can to advantage be used not only for rotating bands, but particularly also for guiding the paper, as for instance, when reeling it on the reel, reeling or unreeling it on the re-reel, the winder, longitudinal cutter and for other similar purposes.

I claim:—

1. A control device for operative mechanism, comprising a casing, pistons disposed in said casing, face to face, with their piston rods extending in opposite directions through and out of said casing, a weighted member on one of said piston rods for moving its piston in one direction, yieldable means on the other piston rod for moving its piston in the other direction said weighted member and said yieldable means on said piston rods normally urging the pistons towards each other, a pressure fluid supply means connected with said casing, for supplying the interior of the casing with pressure fluid to act upon the pistons and to move them against the action of said weighted member and said yieldable means to positions as far away from each other as possible when acted upon by the highest pressure of the pressure fluid, and means regulating the exhaust of the pressure fluid means to vary the pressure in the casing, whereby the lower pressures allow the moving of the weighted piston to intermediate positions from its position under highest pressure.

2. A control device for operative mechanism, comprising a casing having an annular wall separating a main chamber from a central chamber the lower end of which at the lower end of said wall is open and in direct communication with the main chamber below it, movable pistons individual to said chambers, yieldable means normally urging the piston in the main chamber upwardly in engagement with the lower end of said wall and for the support of the piston in the central chamber at atmospheric pressure within the main chamber, a pressure fluid supply means for supplying the interior of the casing with pressure fluid, an exhaust pressure fluid means, each of said means being connected with the interior of said main chamber, and means regulating the exhaust of the exhaust pressure fluid means, whereby the pressure in the main chamber is varied from the highest to atmospheric pressure therein, the highest pressure forcing both pistons as far away from each other as possible, and the lower pressures allowing the moving of the central chamber piston to intermediate relative positions between its highest and lowest positions.

3. A control device for operative mechanism, comprising a casing having an annular wall separating a main chamber from a central chamber the lower end of which at the lower end of said wall is open and in direct communication with the main chamber below it, movable pistons individual to said chambers, yieldable means normally urging the piston in the main chamber upwardly in engagement with the lower end of said wall and for the support of the piston in the central chamber at atmospheric pressure within the main chamber, a pressure fluid supply means, an exhaust pressure fluid means, each means being connected with said main chamber, means regulating the exhaust of the exhaust pressure fluid means, whereby the pressure in the main chamber is varied from the highest to atmospheric pressure therein, the highest pressure forcing both pistons as far away from each other as possible, and the lower pressures permitting the central chamber piston to take intermediate relative positions between its highest and lowest positions, a stem on the central chamber piston extending from the casing, ratchet and pawl mechanism exterior to the casing, and means connecting said stem and pawl adapted to swing the pawl into engagement with the ratchet on the elevating movement of the central chamber piston.

WILHELM THALER.